(12) United States Patent
Nyce

(10) Patent No.: US 10,344,487 B2
(45) Date of Patent: Jul. 9, 2019

(54) ATTACHMENT AND SUPPORT MEMBERS FOR MODULAR BUILDING STRUCTURES

(71) Applicant: Oldcastle Light Building Products, LLC, Atlanta, GA (US)

(72) Inventor: Daniel M. Nyce, Perkasie, PA (US)

(73) Assignee: Oldcastle Light Building Products, LLC, Atlanta, GA (US)

( * ) Notice: Subject to any disclaimer, the term of this patent is extended or adjusted under 35 U.S.C. 154(b) by 0 days.

(21) Appl. No.: 15/699,583

(22) Filed: Sep. 8, 2017

(65) Prior Publication Data

US 2017/0370113 A1   Dec. 28, 2017

Related U.S. Application Data

(63) Continuation-in-part of application No. 15/236,184, filed on Aug. 12, 2016, now Pat. No. 9,914,467.

(Continued)

(51) Int. Cl.
*E04G 21/16* (2006.01)
*E04B 1/35* (2006.01)
(Continued)

(52) U.S. Cl.
CPC .............. *E04G 21/163* (2013.01); *B60P 3/40* (2013.01); *B62B 1/10* (2013.01); *E04B 1/34807* (2013.01); *E04B 1/35* (2013.01); *B62B 1/14* (2013.01); *B62B 1/262* (2013.01); *B62B 3/0606* (2013.01); *B62B 3/0618* (2013.01); *B62B 3/102* (2013.01); *B62B 3/12* (2013.01); *B62B 2203/10* (2013.01);
(Continued)

(58) Field of Classification Search
CPC ..... E04G 21/163; E04B 1/34807; E04B 1/35; B62B 1/10; B62B 1/14; B65D 90/0033; B65D 90/143; B60P 1/6445
See application file for complete search history.

(56) References Cited

U.S. PATENT DOCUMENTS 1,460,283 A    6/1923  Shutsa
3,243,193 A *  3/1966  Bivins ................. B60P 7/13
                                                  254/45

(Continued)

OTHER PUBLICATIONS

Official Action for U.S. Appl. No. 15/236,184, dated Jun. 7, 2017 8 pages.

(Continued)

*Primary Examiner* — Kaitlin S Joerger
(74) *Attorney, Agent, or Firm* — Sheridan Ross PC

(57) ABSTRACT

Systems and methods are provided for securing a transport device to preexisting studs or support members. One embodiment includes a clamp assembly with a compression fitting adapted to be secured to a plurality of different sized studs or wall supports, and further to support additional supports including, but not limited, horizontal support members. A transport device is further provided that is selectively connectable to clamp and support members of the disclosure. In another embodiment, a hook bracket is provided which includes a projection configured to be positioned in a hole through a stud. The extension may include a notch to engage a portion of the stud. The hook bracket includes at least one aperture adapted to secure the hook bracket to a support member operatively interconnected to the transport device.

20 Claims, 14 Drawing Sheets

Related U.S. Application Data

(60) Provisional application No. 62/205,327, filed on Aug. 14, 2015.

(51) Int. Cl.
  B60P 3/40 (2006.01)
  B62B 1/10 (2006.01)
  E04B 1/348 (2006.01)
  B62B 1/26 (2006.01)
  B62B 1/14 (2006.01)
  B62B 3/06 (2006.01)
  B62B 3/12 (2006.01)
  B62B 3/10 (2006.01)

(52) U.S. Cl.
  CPC ... *E04B 1/34869* (2013.01); *E04B 2001/3588* (2013.01)

(56) References Cited

U.S. PATENT DOCUMENTS

| | | | |
|---|---|---|---|
| 3,631,999 A | | 1/1972 | Walerowski |
| 3,661,052 A | | 5/1972 | Lucien et al. |
| 3,753,328 A | | 8/1973 | Papsco |
| 3,795,336 A | * | 3/1974 | Acker ............... B60P 1/6445 280/43.23 |
| 3,834,111 A | * | 9/1974 | Acker ............... B60P 1/6445 52/122.1 |
| 3,852,926 A | | 12/1974 | Papsco |
| 4,458,786 A | * | 7/1984 | Lebre ............... B66F 9/06 182/141 |
| 4,530,411 A | * | 7/1985 | Grinwald ........... B62D 53/0864 180/11 |
| 4,570,959 A | * | 2/1986 | Grinwald ........... B60P 3/40 280/43.23 |
| 4,611,816 A | | 9/1986 | Traister et al. |
| 4,863,334 A | | 9/1989 | Girerd |
| 4,866,797 A | | 9/1989 | Vollan |
| 4,930,598 A | | 6/1990 | Murrill et al. |
| 5,006,032 A | | 4/1991 | Riedl et al. |
| 5,509,237 A | | 4/1996 | Coulter |
| 5,727,767 A | | 3/1998 | Jefrey |
| 5,800,114 A | | 9/1998 | Secondi |
| 6,381,907 B1 | | 5/2002 | MacKarvich |
| 6,471,171 B1 | | 10/2002 | Vandervelde |
| 6,520,705 B2 | | 2/2003 | Stasney, Jr. |
| 7,093,691 B1 | | 8/2006 | Vaughan et al. |
| 7,140,157 B2 | | 11/2006 | Oliver et al. |
| 7,325,817 B1 | | 2/2008 | Jankowski |
| 7,914,017 B2 | | 3/2011 | Setzer, Sr. et al. |
| 8,534,625 B2 | | 9/2013 | Heath et al. |
| 9,266,670 B2 | * | 2/2016 | Fjetland ............ B65D 90/0033 |
| 9,617,130 B2 | | 4/2017 | Crumpler, Jr. |
| 2001/0029715 A1 | * | 10/2001 | Bradley ............... E04F 21/18 52/344 |
| 2003/0213197 A1 | | 11/2003 | Oliver et al. |
| 2007/0020071 A1 | | 1/2007 | Williams |
| 2007/0294954 A1 | | 12/2007 | Barrett et al. |
| 2008/0236056 A1 | | 10/2008 | Hourihan |
| 2009/0100769 A1 | | 4/2009 | Barrett et al. |
| 2010/0193290 A1 | | 8/2010 | Cui |
| 2011/0056147 A1 | | 3/2011 | Beaudet |
| 2012/0240482 A1 | | 9/2012 | Pitt et al. |
| 2013/0086849 A1 | | 4/2013 | Clouser et al. |
| 2013/0152485 A1 | | 6/2013 | Austin et al. |
| 2017/0044755 A1 | | 2/2017 | Nyce |

OTHER PUBLICATIONS

Notice of Allowance for U.S. Appl. No. 15/236,184, dated Oct. 30, 2017 5 pages.

U.S. Appl. No. 15/814,652, filed Nov. 16, 2017, Nyce.

* cited by examiner

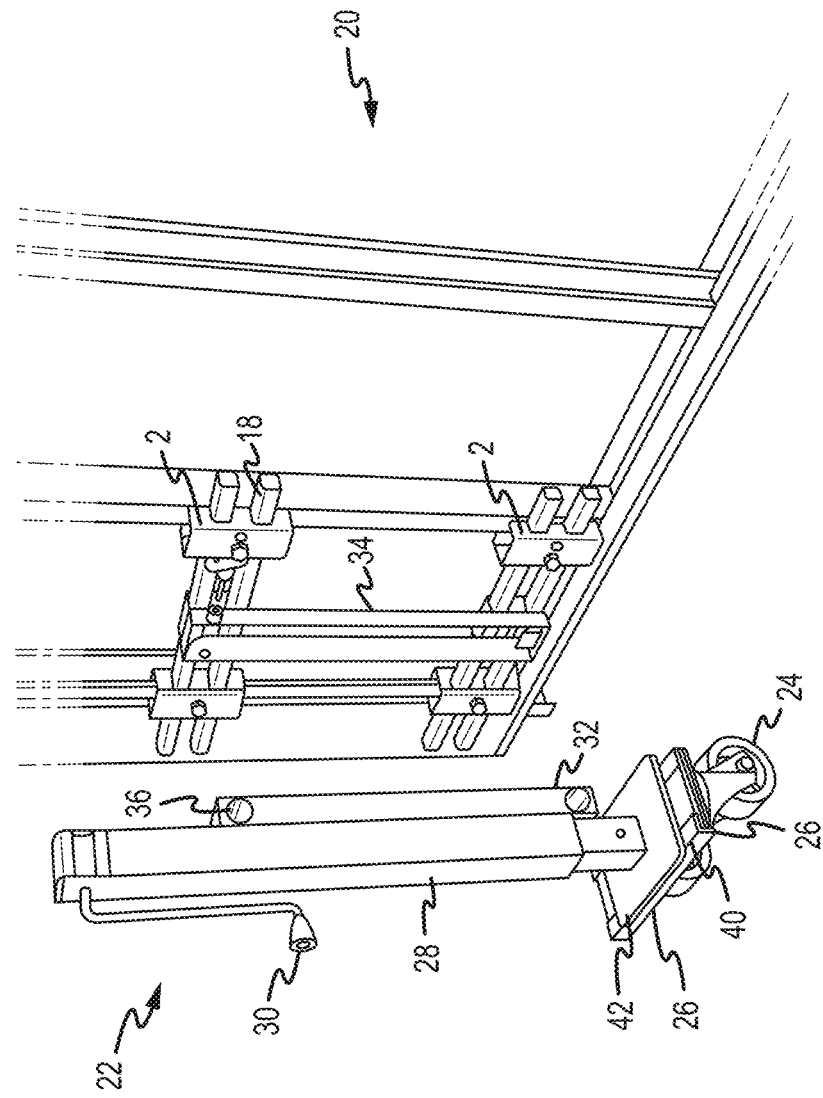

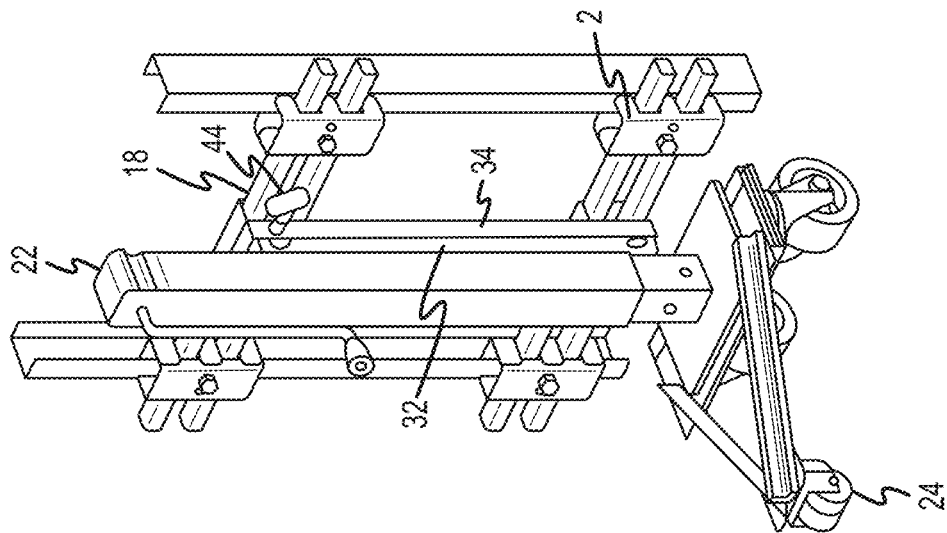
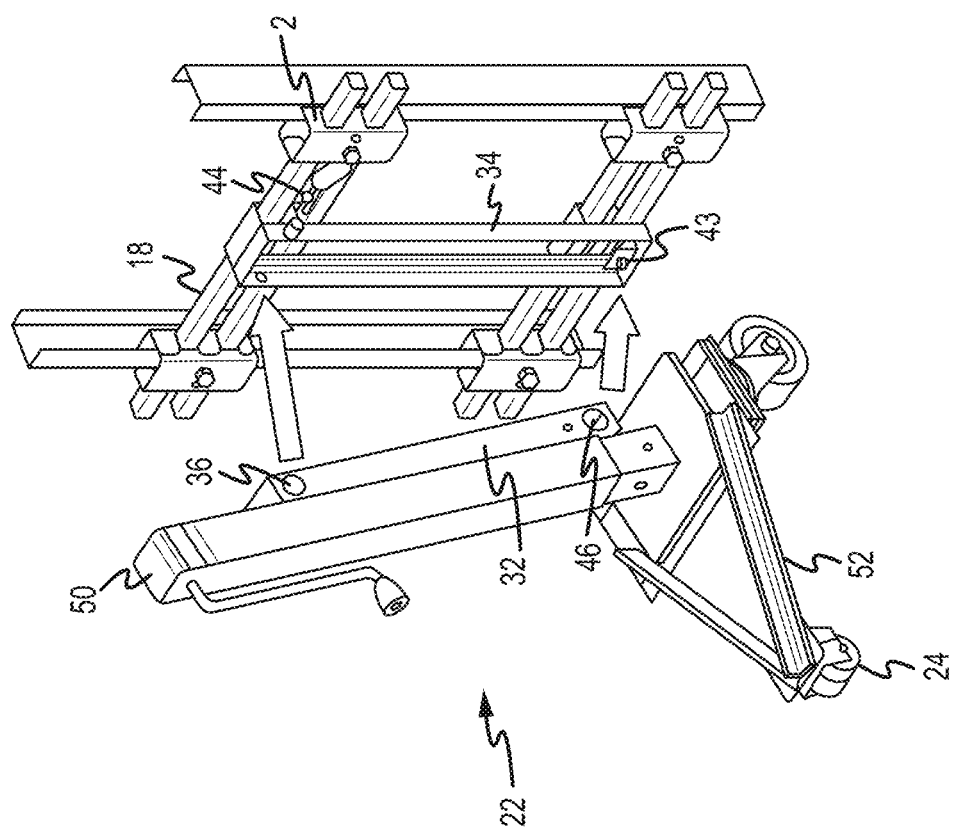
FIG. 7B
FIG. 7A

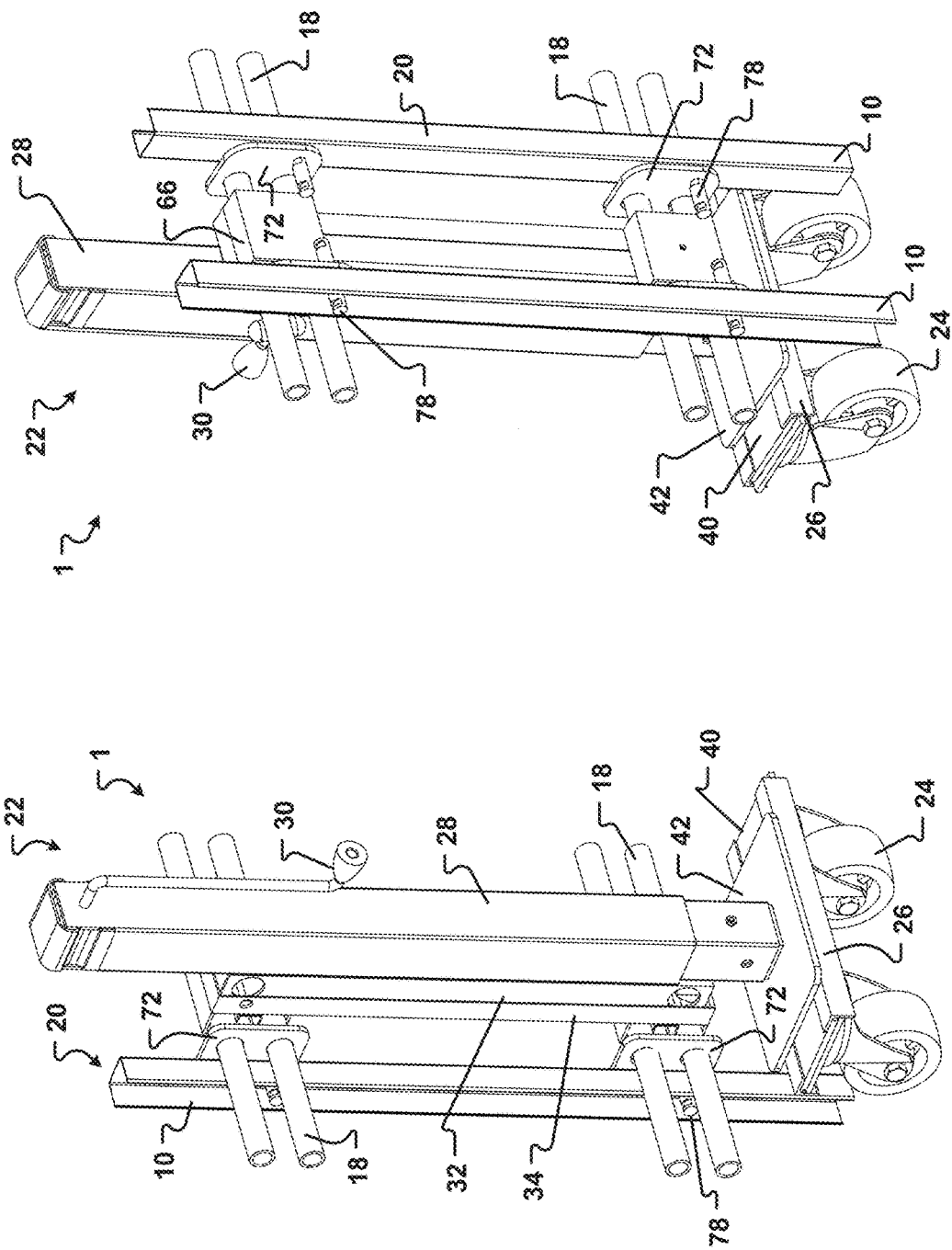

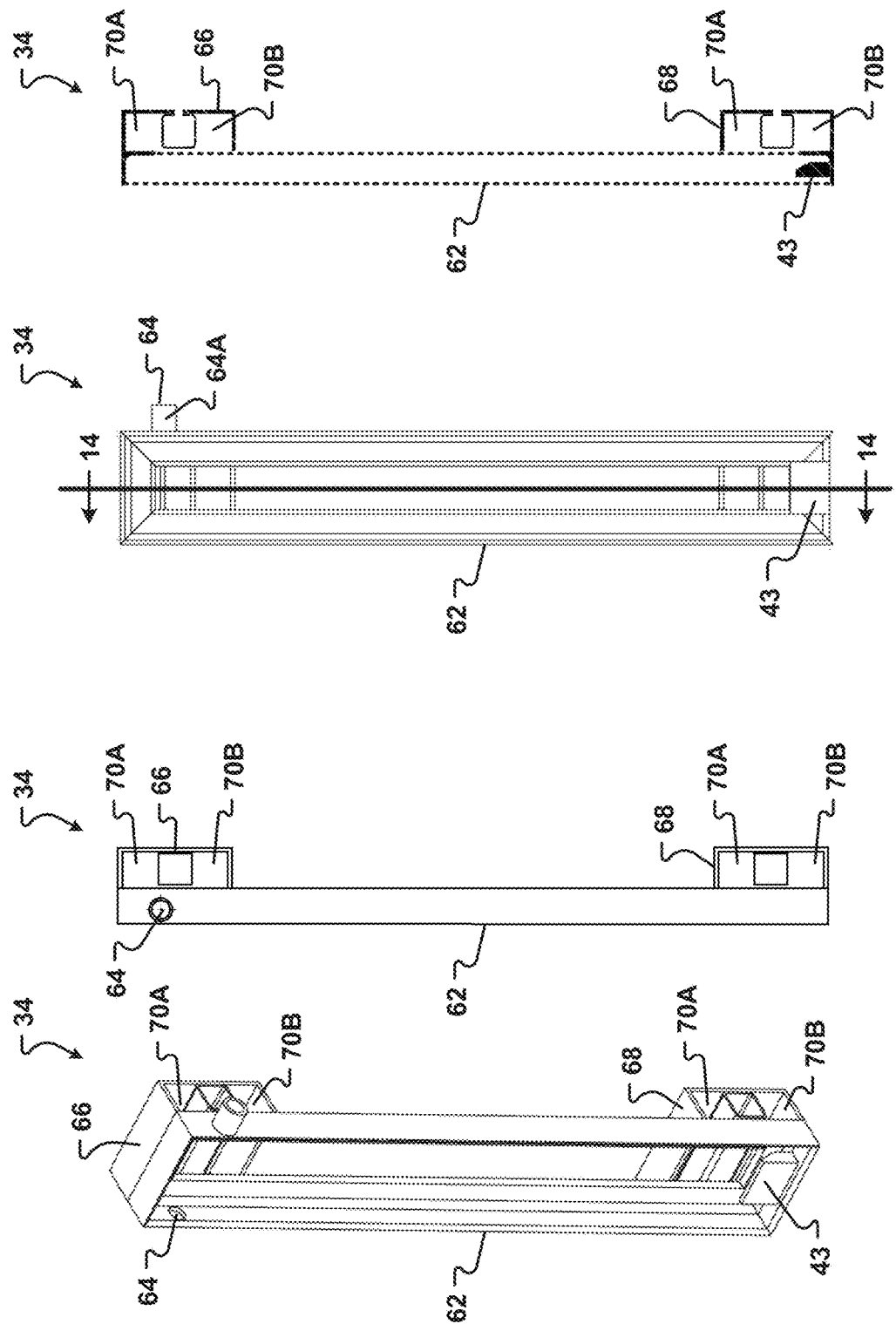

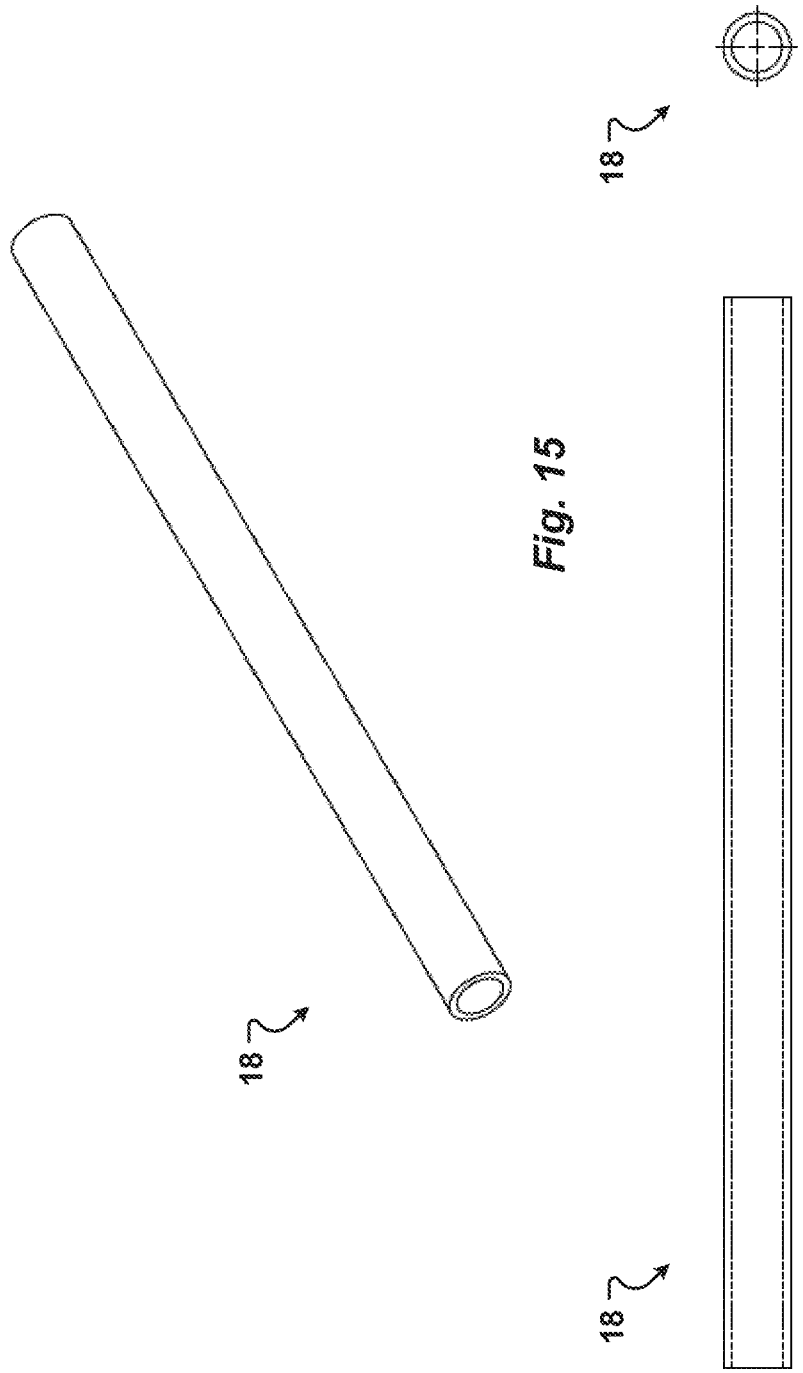

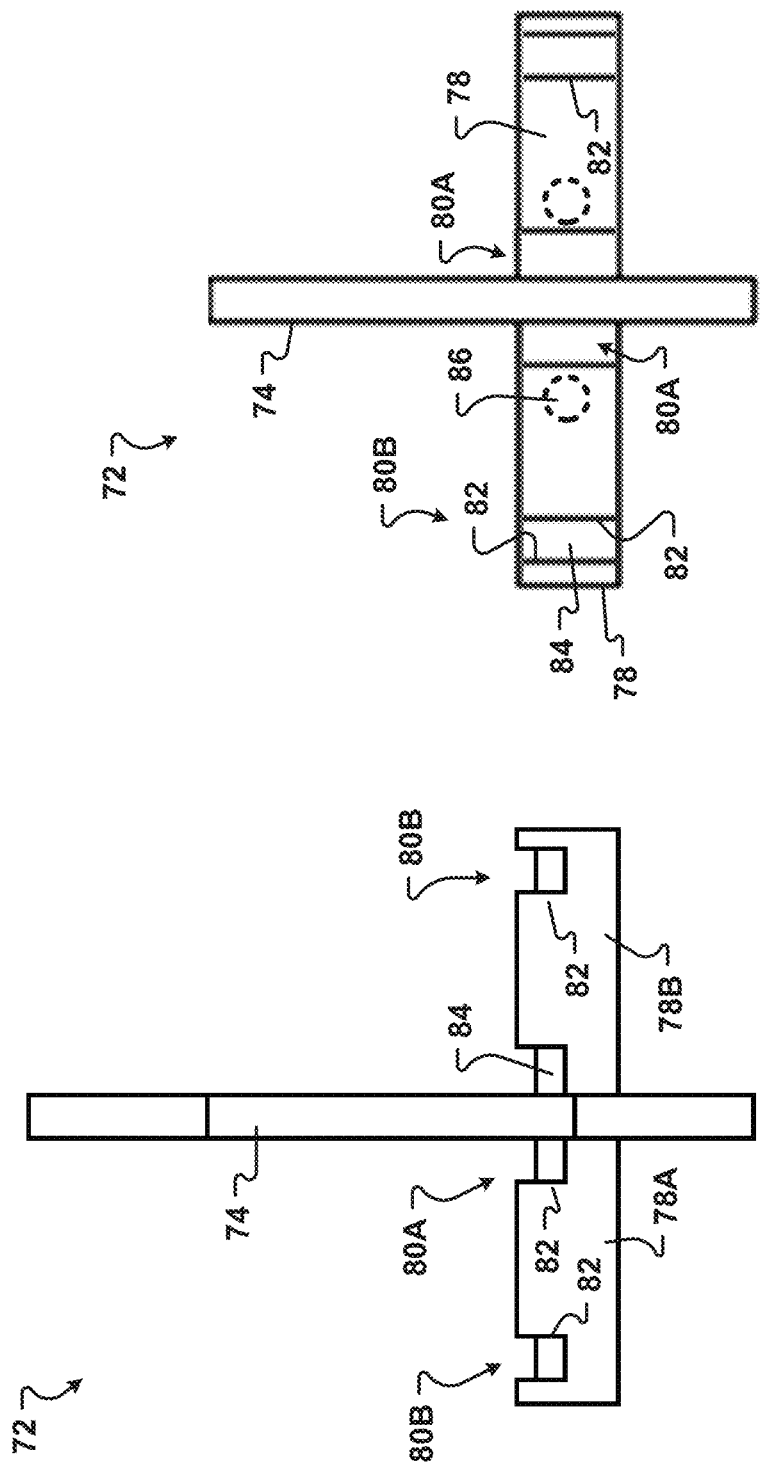

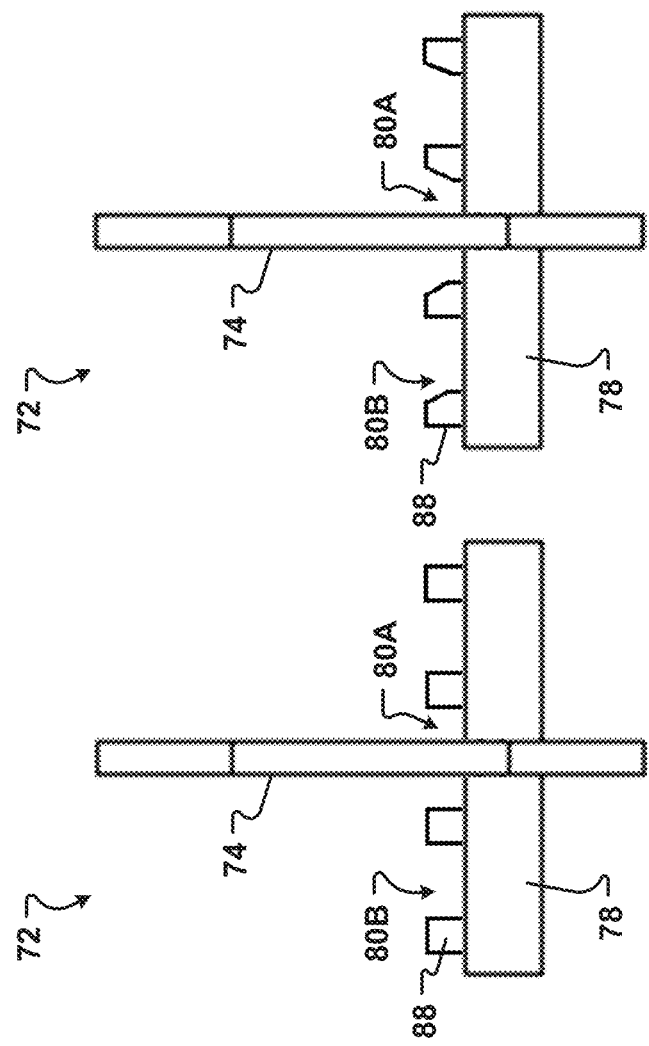
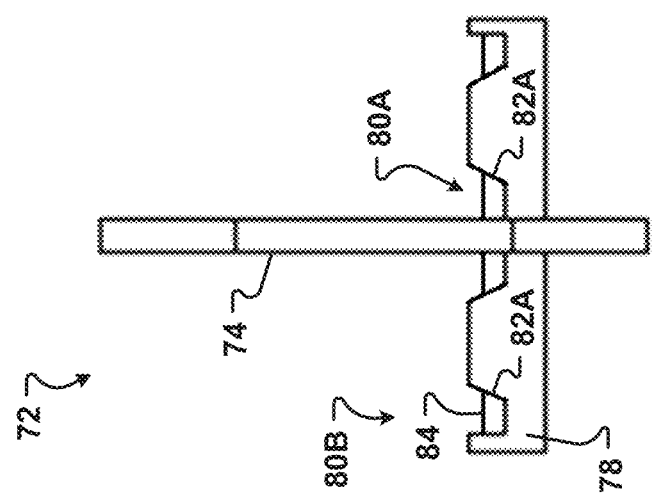

ATTACHMENT AND SUPPORT MEMBERS FOR MODULAR BUILDING STRUCTURES

CROSS-REFERENCE TO RELATED APPLICATIONS

This U.S. Non-Provisional patent application is a continuation-in-part of U.S. patent application Ser. No. 15/236,184, filed Aug. 12, 2016 which claims the benefit of priority from U.S. Provisional Patent Application Ser. No. 62/205,327, filed Aug. 14, 2015, the entire disclosure of both of which are incorporated by reference herein.

FIELD

The present disclosure relates to clamps and fasteners and devices for connecting to such features. More specifically, the present disclosure relates to a unique clamp for attaching items to preexisting framing stud members. Such items include horizontal support members and various other features to be supported by an existing stud or support, and load-bearing transport devices for supporting, moving and positioning modular building structures such as modular rooms.

SUMMARY

Various embodiments of the present disclosure provide new and useful universal framing stud clamp members. Such embodiments provide devices for securely attaching and securing items such as load bearing bars to framing stud members.

It is one aspect of the present disclosure to provide a universal framing stud clamp that can be selectively secured to a plurality of different sized features, such as studs of different profiles and gauges.

In one embodiment, a clamp adapted for interconnection to a pre-existing support member is provided, the clamp comprising a first member and a second member, each of the first member and the second member comprising a face plate adapted to contact a support member and apply a compression force thereto. The first member and the second member comprise a plurality of extensions or projections provided substantially perpendicular to the face plates, and void spaces are provided between at least some of the plurality of extensions. A fastener extends through the first member and the second member, and the fastener provides a compression force on the clamp and a support member provided between the first member and the second member.

It is another object of the present disclosure to provide a new and useful moving and positioning device which is more efficient in use and operation and more universally functional and versatile in application and operation than known prior art attachment devices. It is a further object of the present disclosure to provide such a device that is adapted for use with modular building structures, such as modular or prefabricated rooms.

In various embodiments, the present disclosure provides a modular building moving and positioning device that is adapted to move and position modular building or room structures such as bathrooms, kitchens, classrooms, offices, or other modular rooms whether or not specifically referred to herein and which will be recognized by one of skill in the art.

It is also an object of the present disclosure to provide a moving and positioning device comprising the ability to connect to various wall stud profiles and gauges, such that a single transport device is suitable for use with various objects of different size and shape.

U.S. Pat. No. 7,914,017 to Setzer Sr., which is incorporated by reference herein in its entirety, discloses a hand truck with an electronic module, a scale and a control unit. Although various features of Setzer Sr. are contemplated for use in embodiments of the present disclosure, the present disclosure further provides features wherein a hand truck or moving device is adapted to secure to various preexisting support features as shown and described herein.

U.S. Pat. No. 3,631,999 to Walerowski, which is hereby incorporated by reference in its entirety, discloses a transporting device with vertical lifting means. Walerowski, however, fails to disclose various features of the present disclosure including, for example, a device that is adapted to secure to modular building structures and related features.

In certain embodiments, the support, moving and positioning devices disclosed herein are used for moving and lifting stud framed structures into position. Such devices can be separated into sections for easy attachment, and improved productivity on site. A sliding clamp design allows a jack to be positioned on various stud spacing for optimized locating of the jack. Devices of the present disclosure comprise the ability to attach to stud framed walls and lift the unit sufficiently to remove a pallet and subsequently lower the unit completely into a recessed depression, for example. Traditionally this operation would require multiple devices, and significantly more effort of the device, applying equal even pressure to the load bars.

In various embodiments, a method of manipulating and/or transporting a modular building structure is provided. In one embodiment, a method of manipulating a modular building structure comprises the steps of providing a moveable support member for connection to a modular building unit, the support member comprising a horizontal support member with at least one wheel secured thereto, a telescoping vertical support member, a user-interface for selectively extending and retracting said vertical support member, and a load bearing interface for selective attachment to a fixed object. A clamp is provided in one embodiment and is adapted for interconnection to a pre-existing support member and comprises a first member and a second member, each of the first member and the second member comprise a face plate adapted to contact a support member and apply a compression force thereto. The first member and the second member comprise a plurality of extensions or projections provided substantially perpendicular to the face plates, and void spaces are provided between at least some of the plurality of extensions. A fastener extends through the first member and the second member. The fastener provides a compression force on the clamp and a support member provided between the first member and the second member.

The method comprises a step of securing the clamp to at least one structural support which, in certain embodiments, comprises a wall stud or frame member of the modular building unit. The clamp is secured to the structural support at least in part by application of a force to the fastener. At least one horizontal support is provided that extends from or through and is provided in force transmitting communication with the modular building structure by way of the clamp.

Once the clamp is secured, the method comprises the step of selectively interconnecting the moveable support member to at least one of the clamp and the horizontal support. Subsequent to connection of the moveable support member, the support member is manipulated to alter at least one of a vertical and horizontal position of the modular building structure. In certain embodiments, the method further comprises securing at least two clamps to at least two structural support members. Additionally, in certain embodiments, it is contemplated that a plurality of moveable support members are provided and secured to the modular building structure by connection to at least one of a clamp and a horizontal support member.

In one embodiment, a moveable support member for connection to a modular building unit is provided, the support member comprising a horizontal support member with at least one wheel secured thereto, a telescoping vertical support member, a user-interface for selectively extending and retracting said vertical support member, and a load bearing interface for selective attachment to a fixed object.

Another aspect of the present disclosure is a new and useful universal hook bracket for securely interconnecting to load bearing bars and framing stud members. The hook bracket generally includes a body portion, an aperture, and an extension. The extension is configured to be inserted into a hole through a vertical stud member of a modular building. Optionally, the extension includes a notch to receive the stud member. Once the hook bracket is secured to the stud member, the hook bracket may be selectively interconnected to a mobile support apparatus.

In one embodiment, the mobile support apparatus includes a footer, a lifting jack, and an extension. The extension is interconnected to the lifting jack and configured to interconnect the lift jack to a load bearing bracket. In one embodiment, the extension includes an open bottom portion and a transverse bore.

The load bearing bracket generally includes first and second receivers interconnected to a body portion. A projection extends from the body portion. The projection is configured to be selectively received in the open bottom portion of the extension. The body portion also includes an aperture that aligns with the transverse bore of the extension. After the projection of the body portion is received in the open bottom portion of the support apparatus extension, a pin may be extended through the aperture and the transverse bore to interconnect the load bearing bracket to the extension of the mobile support apparatus.

The first and second receivers are each configured to receive a support member. The support member is sized to fit through the aperture of a hook bracket to selectively interconnect the mobile support apparatus to the hook bracket. In this manner, a hook bracket may be interconnected to a support member associated with one of the first and second receivers. Thus, the hook bracket facilitates quick and secure interconnection of the modular building to the mobile support apparatus.

One aspect of the present disclosure is a system for selective interconnection to a stud member of a building unit. The system includes, but is not limited to: (1) a hook bracket with an extension, the extension operable to fit through a hole of the stud member and apply a vertically oriented force thereto; (2) a support member selectively interconnectable to the hook bracket, the support member oriented substantially horizontally; and (3) a transport device to operatively engage the support member. In one embodiment, the hook bracket further includes a body portion. In another embodiment, the body portion is generally planar. The extension projects from the body portion.

In one embodiment, an aperture extends through the body portion. In one embodiment, the aperture is generally circular. In another embodiment, the aperture has a shape that is generally triangular, square, or rectangular. Optionally, the support member can selectively extend through the aperture of the body portion to interconnect the support member to the hook bracket. In another embodiment, the support member is interconnected to the support member with a fixture. In yet another embodiment, the hook bracket may be selectively positioned along a length of the support member to accommodate spacing between the stud member and a second stud member of the building unit.

In one embodiment, the transport device comprises a dolly. The transport device can optionally further include one or more of a lifting jack and an extension interconnected to the lifting jack. In one embodiment, the extension of the transport device is configured to connect to a bracket to which the support member is engaged.

Optionally, the extension of the hook bracket includes a notch to receive a portion of the stud member. In one embodiment, the notch includes a first sidewall, a bottom portion, and a second sidewall. The bottom portion can have a shape that is generally arcuate. More specifically, in one embodiment, the bottom portion has a radius of curvature. Optionally, the radius of curvature can be about equal to a radius of curvature of the hole through the stud member. Alternatively, the bottom portion can be substantially planar. In one embodiment, the bottom portion is generally linear.

In one embodiment, the first and second sidewalls of the notch are generally parallel. Alternatively, the first and second sidewalls diverge. In this embodiment, the notch has a "V" shape with the bottom portion forming a truncated apex. Optionally, at least one of the first and second sidewalls is substantially orthogonal to a longitudinal axis of the extension. In one embodiment, one or more of the first and second sidewalls is generally transverse to the longitudinal axis. In another embodiment, one of the first and second sidewalls is define by a portion of the body portion.

Optionally, in another embodiment, the extension of the hook bracket includes a protrusion. The protrusion may extend from an upper portion of the extension. In one embodiment, the protrusion has a shape that is generally square. The protrusion is spaced a predetermined distance from the body portion of the hook bracket. Accordingly, the protrusion and the body portion define a notch therebetween.

In another embodiment, a bore extends at least partially through the extension of the hook bracket. A pin can be positioned in the bore to prevent movement of the stud member with respect to the extension. In one embodiment, the bore extends to an upper surface of the extension. Optionally, the bore may be substantially perpendicular to a longitudinal axis of the extension.

Optionally, the extension of the hook bracket can have a cross-sectional shape which generally corresponds to the shape of the hole of the stud member. In one embodiment, the extension has a shape that is generally cylindrical. The extension, in one embodiment, can project from each of a first side and a second side of the body portion. Alternatively, the extension can project from only one of the first and second sides of the body portion. In one embodiment, the extension is substantially perpendicular to the body portion of the hook bracket. Alternatively, in another embodiment, the extension is interconnected to the body portion at an oblique angle. In this manner, a distal end of the extension is angled upwardly toward a top portion of the body portion of the hook bracket.

It is another aspect of the present disclosure to provide a hook bracket to operatively interconnect a transport device to a stud member of a building unit. The hook bracket generally comprises: (1) a body portion; (2) a first aperture extending at least partially through the body portion; (3) a second aperture extending at least partially through the body portion, the first and second apertures configured to receive first and second support members operatively engaged by the transport device; and (4) an extension projecting from the body portion, the extension operable to contact the stud member such that the transport device may transmit a force to the building unit.

In one embodiment, the first and second apertures have shapes that are generally circular. In another embodiment, the shape of at least one of the first and second apertures is triangular, square, or rectangular.

The extension is configured to extend through an aperture through the stud member. In one embodiment, the extension has a cross-section that generally corresponds to the shape of the stud member. Optionally, the cross-sectional shape of the extension can be substantially circular. In another embodiment, the extension is substantially perpendicular to the body portion. Optionally, the extension can be arranged at an oblique angle with respect to the body portion.

In one embodiment, the extension includes a notch. The notch generally includes a first sidewall, a bottom portion, and a second sidewall. In one embodiment, the first and second sidewalls are substantially parallel. In another embodiment, the first and second sidewalls converge. The bottom portion can have a surface that is generally arcuate. Accordingly, in one embodiment, the bottom portion is non-planar. Alternatively, the bottom portion can be planar.

Another aspect of the present disclosure is a method of interconnecting a transport device to a stud member of a building unit. The method includes, but is not limited to, one or more of: (1) interconnecting a support member to a load bearing bracket; (2) guiding the support member through an aperture of a hook bracket; (3) positioning an extension of the hook bracket in an aperture extending at least partially through the stud member; and (4) interconnecting the transport device to the load bearing bracket. Optionally, the extension of the hook bracket has a shape that is generally cylindrical.

In one embodiment, the extension includes a notch to engage a portion of the stud member. The notch is generally defined by a sidewall, a bottom portion, and a body portion of the hook bracket. In one embodiment, the notch includes a first sidewall, a bottom portion, and a second sidewall.

In one embodiment, interconnecting the transport device to the load bearing bracket further comprises: positioning a projection of the load bearing bracket in a receiver of the transport device; and guiding a pin through the receiver and the load bearing bracket.

BRIEF DESCRIPTION OF THE FIGURES

FIG. 6 is a perspective view of a mobile support apparatus according to one embodiment of the present disclosure.

FIG. 7A is a perspective view of a mobile support apparatus according to one embodiment of the present disclosure.

FIG. 7B is a perspective view of a mobile support apparatus according to one embodiment of the present disclosure.

FIG. 8A is a rear perspective view of a mobile support apparatus of another embodiment of the present disclosure in a secured position interconnected to the framework of a modular building by a hook bracket.

FIG. 8B is a front perspective view of the mobile support apparatus according to the embodiment of FIG. 8A.

FIG. 11 is a rear perspective view of a load bearing bracket according to one embodiment of the present disclosure.

FIG. 12 is a side elevation view of the load bearing bracket according to the embodiment of FIG. 11.

FIG. 13 is a rear elevation view of the load bearing bracket of FIG. 11.

FIG. 14 is a cross-sectional side elevation view of the load bearing bracket taken along lone 14-14 of FIG. 13.

FIGS. 15-17 are views of a support member according to one embodiment of the present disclosure, the support member to interconnect a mobile support apparatus to a hook bracket.

FIG. 20 is a front elevation view of the hook bracket according to the embodiment of FIG. 18.

FIG. 21 is a top plan view of the hook bracket;

FIG. 22 is a front elevation view of a hook bracket according to another embodiment of the present disclosure wherein grooves formed in an extension of the hook bracket include at least one sidewall angled toward another sidewall.

FIG. 23 is another front elevation view of a hook bracket with an extension with projections according to yet another embodiment.

FIG. 24 is a front elevation view of another embodiment of a hook bracket and wherein the hook bracket includes an extension with projections having at least one tapered sidewall.

DETAILED DESCRIPTION

Figure 1:
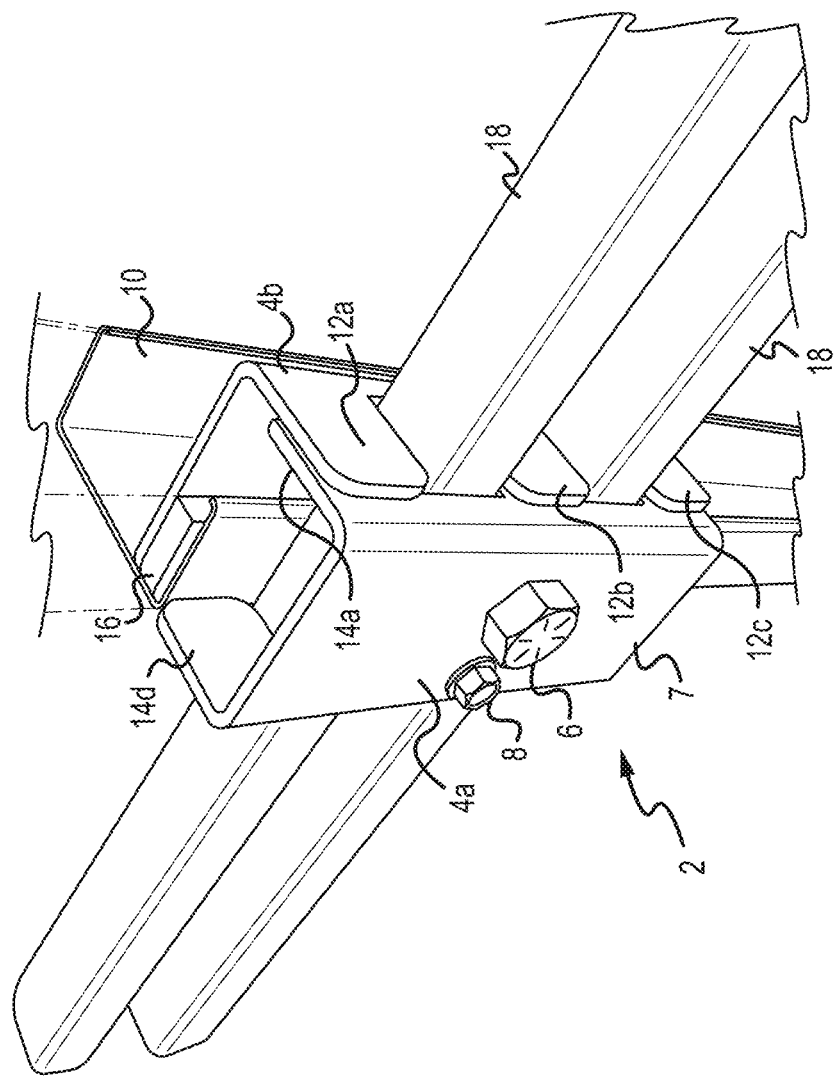
FIG. 1 is a front perspective view of a clamp interconnected to horizontal structural supports according to one embodiment of the present disclosure.

The following is a listing of components according to various embodiments of the present disclosure, and as shown in the drawings:

1 System
2 Clamp
4a, 4b First and Second Members
6 Primary Fastener
7 Face Plate
8 Shear Pin
10 Stud Member
12a, 12b, 12c Extensions 14a, 14b, 14c, 14d Extensions
16 Lip
18 Support Member
20 Modular Building Unit
22 Support Device
24 Wheels
26 Platform Support Portion
28 Main Lifting Jack Body
30 User Interface
32 Load Bearing Extension
34 Load Bearing Bracket
36 First Aperture
40 Tray
42 Footer
43 Projection
44 Pin
46 Second Aperture
50 Vertical Support
52 Horizontal Support
54 Jack inner portion
56 Jack outer portion
58 Open bottom of extension
60 Transverse bore of extension
62 Body portion of bracket
64 Aperture
66 First receiver
68 Second receiver
70 Transverse channels
72 Hook bracket
74 Body portion
75 Top edge
76 Aperture
78 Extension
80 Notch
82 Sidewalls
84 Bottom portion
86 Bore through extension
88 Protrusion of extension FIG. 1 is a perspective view of a clamp 2 for securing to various objects including, but not limited to, load bearing bars and framing stud members. As shown in FIG. 1, a clamp 2 comprises a first member 4a and a second member 4b, the first and second members 4a, 4b are provided in opposing relationship and are adapted to be secured to at least one of a stud member 10 and an additional support member 18. In the embodiment of FIG. 1, the support member 18 comprises a substantially horizontally extending bar or beam for supporting various objects such as construction modules or moveable bathroom pods. The embodiment of FIG. 1 provides a clamp that is adapted to secure to a stud member 10 and an additional support member 18 and wherein the additional support member 18 is at least partially supported and takes advantage of the structural integrity of the stud member 10.

FIG. 1 provides a clamp 2 in communication with a stud member 10 and wherein the stud member 10 comprises a c-shaped channel member of formed sheet metal or other materials. It will be recognized, however, that clamps 2 of the present disclosure may be secured to a variety of studs with any variety of geometric shapes, and the disclosure is not limited to devices for securing to the particular stud 10 provided in FIG. 1.

Figure 2:
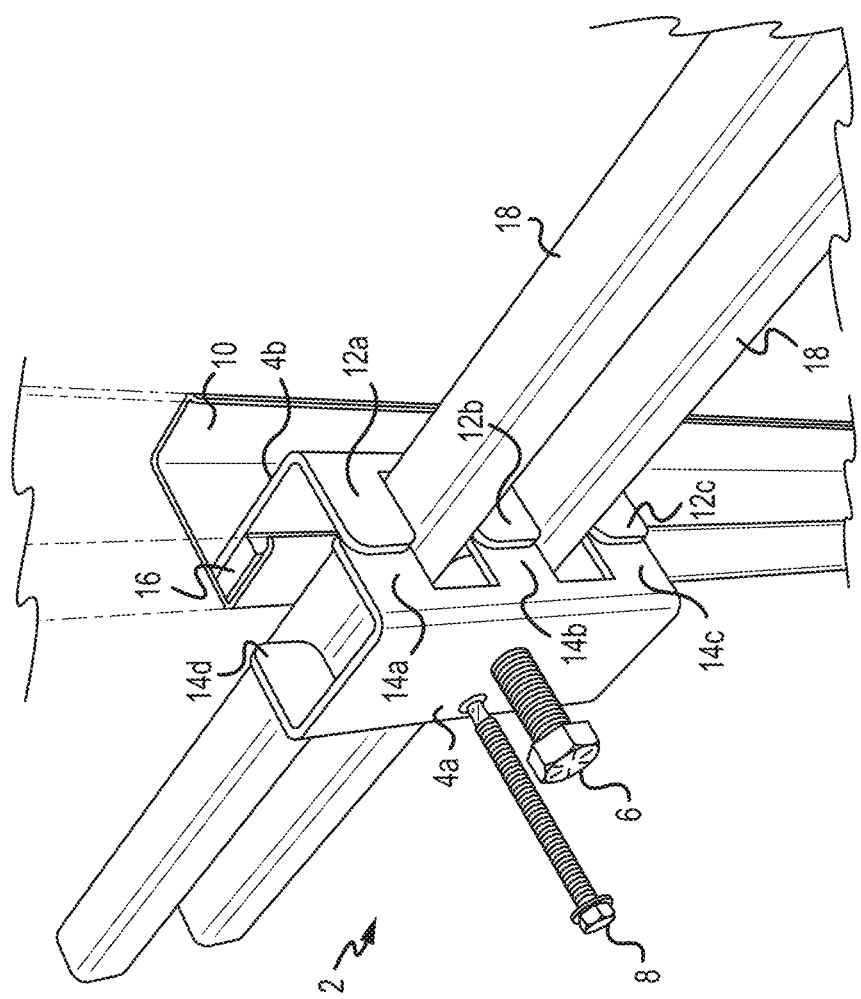
FIG. 2 is a front perspective view of a clamp according to the embodiment of FIG. 1 and further depicting fastening hardware associated with the clamp.

As shown in FIGS. 1-2, the first member 4a of the clamp 2 comprises first, second, third and fourth extensions 14a, 14b, 14c, 14d extending from a face plate 7. The extensions 14 comprise substantially parallel extensions with space provided therebetween to receive and support the support member(s) 18. The second member 4b of the clamp 2 comprises corresponding extensions 12a, 1b, 12c of similar construction and spacing, and wherein an internal width of the extensions 12 of the second member 4b is slightly greater than an external width of the extensions 14 of the first member 4a such that the first member 4a is at least partially received within the second member 4b when provided in an assembled state (see FIG. 1, for example).

In the embodiment of FIGS. 1-2, the second member 4b comprises a lip 16 for placement within the c-channel of the stud 10. In alternative embodiments, however, it is contemplated that the first 4a and second 4b members surround a stud 10 or similar member, rather than communicating with an internal surface of the stud member as shown in FIGS. 1-2.

The first 4a and second 4b members of the clamp 2 are selectively interconnected and secured to a stud 10 and/or support member 18 by a primary fastener 6. The clamp 2 further comprises a shear pin 8. In preferred embodiments, the primary fastener 6 extends through the first member 4a and the second member 4b, but does not pass through the stud 10. Rather, the primary fastener 6 is laterally offset from the stud 10 and creates a clamping force wherein the first 4a and second 4b members are compressed on either side of the stud 10, thereby securing the clamp assembly 10 in a secure and fixed position. In alternative embodiments, the primary fastener 6 extends through the stud 10. Such embodiments typically require forming an aperture and/or tapping the stud 10. In certain embodiments, a shear pin 8 is inserted through the first member 4a to prevent the clamp from slipping when put under load. In certain embodiments, the primary fastener 6 provides a clamping or compression force and comprises a primary load-bearing member. It will be recognized, however, that even when the primary fastener 6 is provided with sufficient torque, some spacing may exist and result in vertical displacement when the device 2 is put under load. The shear pin 8 thus provides additional securing features to prevent such slip.

As further shown in FIGS. 1-2, the first member 4a comprises a substantially symmetrical member with three pairs of parallel extending members 14 and associated channels or spaces provided therebetween for receiving the supports 18. The second member 4b comprises a generally "L" shaped member with one end comprising projections 12 and an opposing end comprising a lip 16 for connecting to the stud 10. In certain embodiments, the lip 16 extends along an entire length of the member 4b and comprises a width that is approximately equal to the width of the inside of a steel stud framing member 10. The primary fastener 6 may be selectively adjusted, and provides means for vertically adjusting the clamp 2 and/or support members 18 when loosened.

Figure 3:
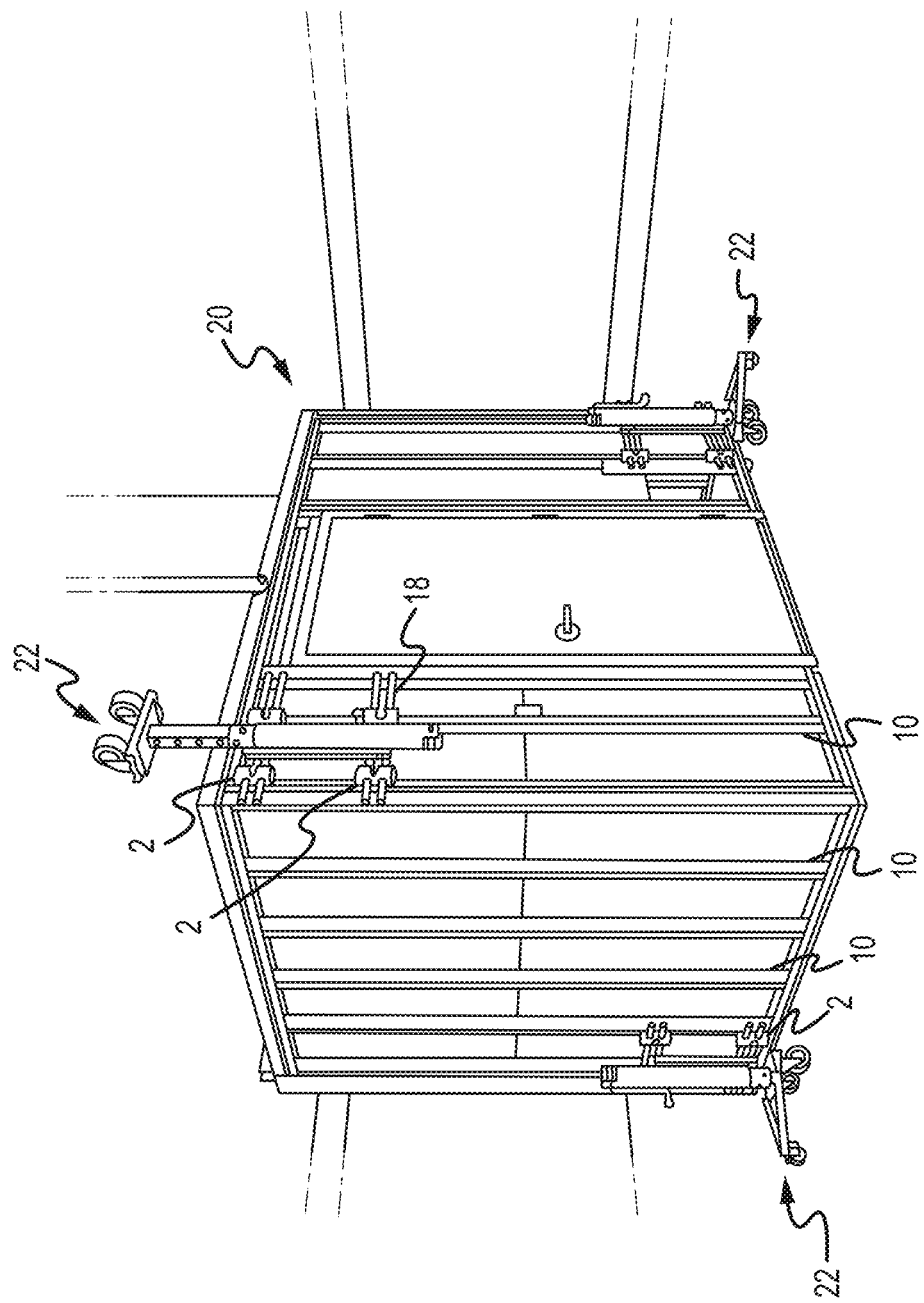
FIG. 3 is a perspective view of a clamp according to one embodiment of the present disclosure and wherein the clamp is interconnected to the framework of a moveable bathroom pod.
Figure 4:
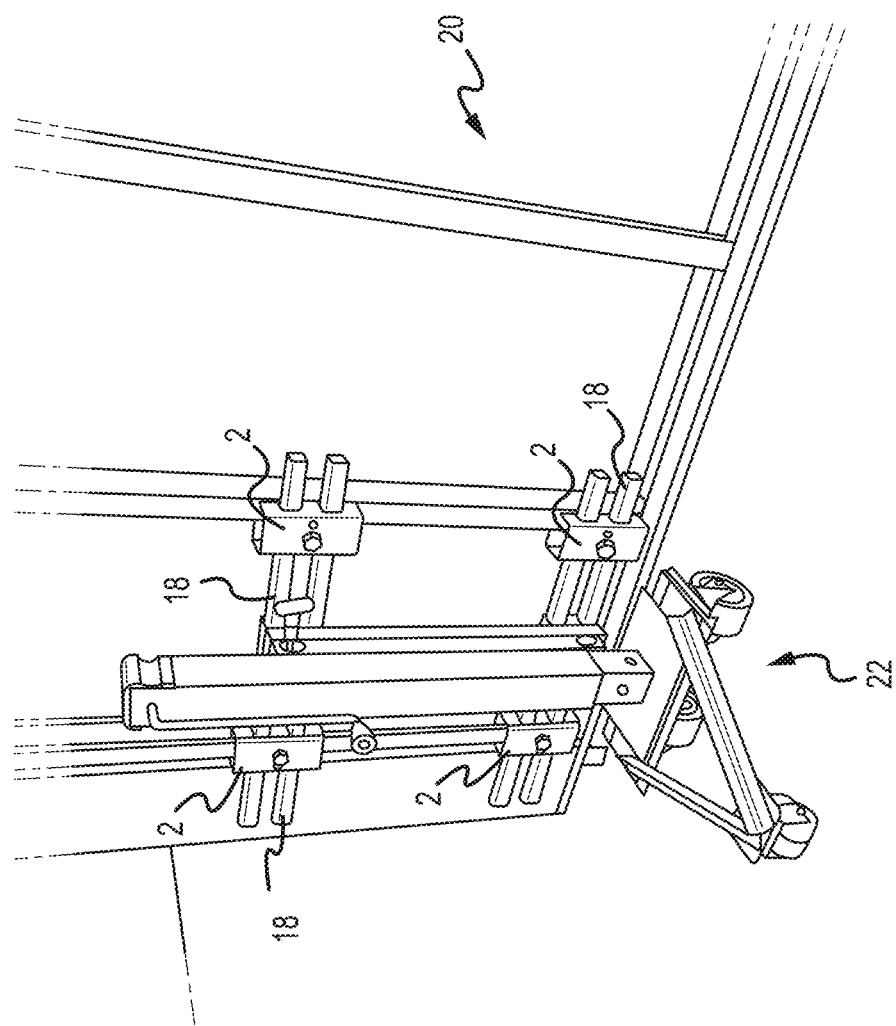
FIG. 4 is a perspective view of a clamp according to one embodiment of the present disclosure and wherein the clamp is in communication with additional features.

FIGS. 3-4 are perspective views of a modular building unit 20 comprising studs 10 or wall supports, wherein clamp members 2 as shown and described herein are secured to the studs 10. The clamp members 2 are also provided in supporting relationship with horizontal supports 18. The horizontal supports 18 are in further communication with one or more weight bearing devices 22. The weight bearing devices 22 of FIGS. 3-4 comprise dollies or hand-trucks adapted to support and transport the modular building unit 20 as may be desired, and including support with respect to both a floor and ceiling surface. In various embodiments, the device 22 comprise hand-operated hydraulic lift features to lift and lower a pod or building unit 20.

Although FIGS. 3-4 depict one embodiment of a clamp 2 and a particular use for such clamps, it will be expressly recognized that the present disclosure is not limited to the support members 18 or additional devices 20, 22 of FIGS. 3-4. Indeed, it is contemplated that the support clamps 2 as shown and described herein may be attached to wall studs or support members and further support any number and any type of additional components including, but not limited to, lighting elements, beams, shelving, vanities, etc.

In FIGS. 3-4, a plurality of clamps 2 are provided for handling and moving processes to push, pull, lift, or support a stud framed structure. For example, clamps 2 and associated features as shown and described herein may be used for lifting or moving a modular unit 20 such as a room, bathroom, kitchen, classroom, garage, or other similar modular structure.

Figure 5:
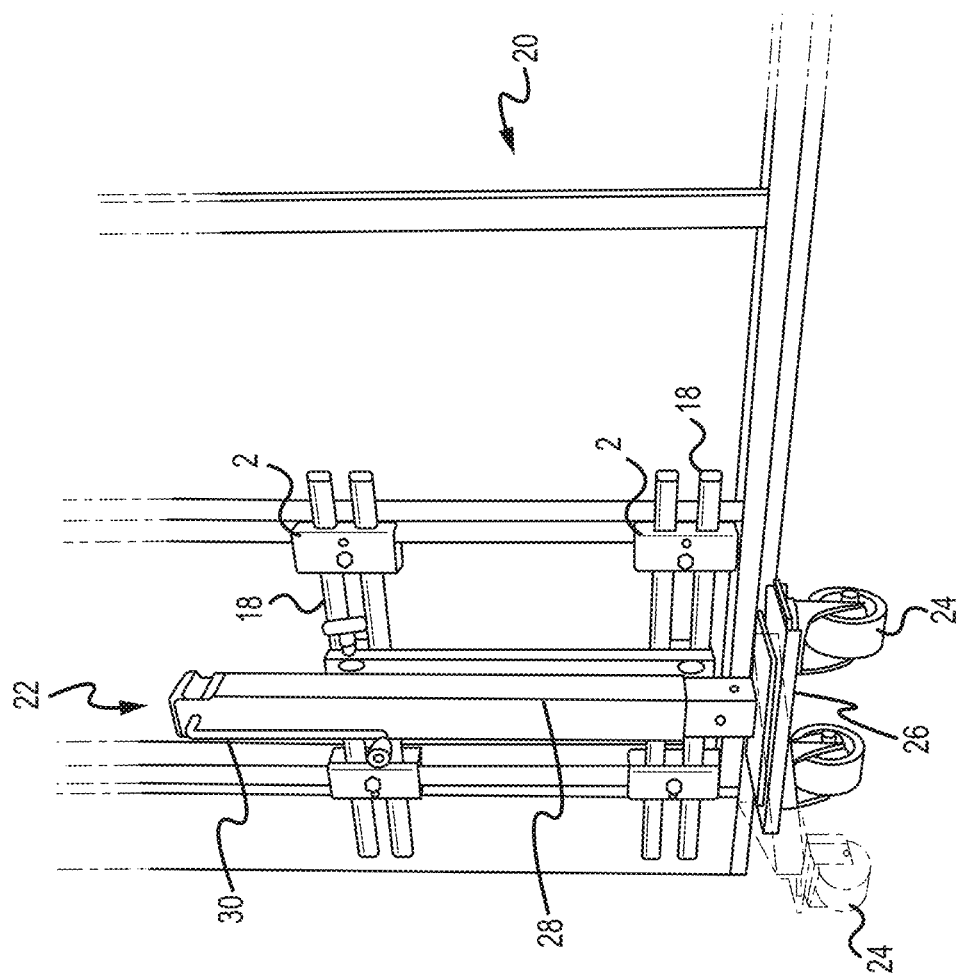
FIG. 5 is a perspective view of a mobile support apparatus according to one embodiment of the present disclosure.

Various embodiments of the present disclosure provide a device for supporting, moving and positioning modular building structures. As shown in FIG. 5, a preferred embodiment of a device 22 is provided that comprises a platform support portion 26 having a plurality of wheels 24 for enabling rolling movement of the device. A main lifting jack body 28 is provided and extends upwardly from the platform support portion 26. As shown in the FIG. 5, a plurality of clamps 2 and associated support members 18 as shown and described herein are provided in connection with a modular building unit 20. The lifting and support device 22 securely attaches to at least one support member 18 as shown in FIG. 5 and provides at least one means for lifting, moving, and/or supporting a modular building unit 20 such as a modular or prefabricated room. As further described herein, the support device 22 comprises lifting or jack features and a user interface 30 to allow a user to apply force to the device 22 and associated components.

FIG. 6 is a perspective view of a modular building unit 20 and a lifting and support device 22 for selectively securing to the modular building unit 20. As shown, the support device 22 comprises a platform member 26 with a plurality of wheels 24, and a support member 28 extending from the platform member 26. In certain embodiments, the platform member 26 comprises a footer 42 of the support that is selectively connected to a horizontal support or tray 40 of the platform member 26. In such embodiments, the support member 28 may be removed from the wheels 24 and tray 40 and the footer 42 may be employed wherein the support member 28 is intended to be used as a basic support without the ability to roll or transport the device. In various embodiments, the support device 22 comprises a height of between approximately 20 and 50 inches, and preferably of approximately 41 inches. In various embodiments, the support device 22 comprises a width of between approximately 5 and 30 inches, and preferably of approximately 20 inches.

In the embodiment of FIG. 6, the support member 28 extends substantially perpendicularly from the platform 26. It will be recognized, however, that various configurations and relative positions of certain portions of the support member 28 are contemplated by embodiments of the present disclosure. At least a portion of the support member 28 is translatable by operation of a user-interface 30 which comprises a hand crank in the depicted embodiment. Movement of the user-interface thus enables a force to be applied to the support device 22 and any associated objects. In certain embodiments, hydraulic jack features such as those described in U.S. Pat. No. 3,661,052 to Ghobert et al., which is hereby incorporated by reference in its entirety, are contemplated for use with the support device 22.

As shown in FIG. 6, a load-bearing bracket 34 is provided and extends between at least two support members 18. The load-bearing bracket 34 is adapted to connect to a load-bearing extension 32 of the support device 22. As shown in FIG. 7, hardware including brackets 2, support members 18, and load-bearing brackets 34 are secured to a modular building structure 20 at various locations on the structure 20. The hardware comprises permanent and semi-permanent hardware that is to remain connected to the structure, and such that support devices 22 may be quickly and easily connected to the structure 20 when needed, and removed when not desired. As further shown in FIG. 7, the load-bearing extension 32 of the support device 22 comprises apertures 36, 46. The apertures 36, 46 are provided to receive support members 18 and comprise an alternative connection means to the connection of the load-bearing extension 32 to a load-bearing bracket 34.

FIGS. 7A and 7B are perspective views of the support device 22 according to an embodiment of the present disclosure. FIG. 7A depicts the support device 22 in a detached position from a load-bearing bracket 34. FIG. 7B depicts the support device 22 in a secured position with a load-bearing bracket 34 and associated components and structures. The attachment of the support device 22 is depicted wherein the support device 22 comprises a load bearing extension 32 in the form a steel tube. The extension 32 comprises a first aperture 36 and a second aperture 46, wherein both apertures extend laterally through the load-bearing extension 32. In preferred embodiments, the load-bearing extension 32 comprises a tube that is open at least at a bottom end of the tube. It will be recognized that the term "tube" is not limited to a device of any particular cross-section and, for the purposes of the present disclosure, may be of round, partially-round, or rectangular cross-section.

In FIG. 7A, the support device 22 is depicted as being rotated or tilted with an upper portion of the device 22 rotated away from the bracket 34. This rotation may be accomplished in various ways. For example, in one embodiment, a rear wheel 24 or support is provided in an elevated position relative to the forward wheels, thereby allowing a user to tilt the device in the depicted manner. In alternative embodiments, at least one of the vertical support portion 50 of the support 22 and horizontal support portion(s) 52 are hinged or rotatable relative to the base of the support device 22. In certain embodiments, however, the various members of the support device 22 are in fixed relative position to each other and the device 22 is tilted or rotated through standard manual manipulation. The rotation of the support device 22 allows the open bottom portion of the extension 32 to receive a projection 43 provided on a lower portion of the bracket 34.

After the extension 32 receives or otherwise attaches to the projection 43, the support device 22 is rotated such that an upper portion of the device 22 is brought into contact or a mating position with the bracket 34. An upper portion of the extension 32 comprises an aperture 36. The aperture 36 is provided and sized to receive a pin associated with or passing through the bracket 34. In certain embodiments, a lower portion of the extension 32 also comprises an aperture for receiving a pin to further secure the device 22 and extension 32 to the bracket 34 and associated structure(s).

Although various features of the support device 22 and bracket 34 are described with respect to FIGS. 7A and 7B, it will be recognized that the present disclosure contemplates rearrangement of the layout and placement of such features. For example, a support device 22 is also contemplated as being inserted into a bracket 34 with an opposite rotation as described above. In such embodiments, features such as the protrusion 42 and various apertures may be relocated to accommodate for such rotation. It will further be recognized that placement of the apertures and pin 44 is not critical and may be varied. In preferred embodiments, however, it is contemplated that such features are provided proximal an upper and lower portion of the extension 32 and bracket 34.

The bracket 34 is contemplated as being secured to additional support members 18 through a variety of means including, but not limited to, welding, U-bolts, and various known fasteners. It is contemplated that the bracket 34 will accommodate a substantial portion of the weight of an object to which it is attached, at least in certain applications and instances. As such, the securing of the bracket 34 to the support members 18 must be of sufficient structural integrity to withstand such loads. The specific method and means of attachment may be varied based on the size and weight of the structure, the number of brackets 34 to be used, etc.

Lifting and support devices of the present disclosure are contemplated for use in pairs or multiples as part of a handling and moving process to push, pull, lift, or support a stud framed structure. Contemplated applications for the device include, but are not limited to, lifting or moving a modular unit such as a building, room, bathroom, kitchen, classroom, garage, or other similar modular structure.

Referring now to FIGS. 8-24, an embodiment of a system 1 for selective interconnection to a pod 20 or a modular building according to another embodiment of the present disclosure is illustrated. The system 1 generally includes a mobile support apparatus 22, a load bearing bracket 34, a support member 18, and a hook bracket 72 for securing a stud member 10 of a modular building 20.

The mobile support apparatus 22 may comprise a dolly or hand-truck adapted to support and transport the modular building 20. In one embodiment, the mobile support apparatus 22 comprises a hand-operated hydraulic lift feature to raise and lower the modular building 20 secured by the hook bracket 72. Various features of the mobile support apparatus 22 are shown and described with respect to FIGS. 1-7 and the discussion of such features is not repeated with respect to FIGS. 8-24.

The mobile support apparatus 22 generally includes a lifting jack 28 which extends from a footer 42. The lifting jack 28 and footer 42 may be used as a support that can raise or lower the modular building 20 without wheels to move the modular building. In one embodiment, the lifting jack 28 is substantially perpendicular with respect to the footer 42; however, other arrangements are contemplated. Optionally, the footer 42 may include a support 26 configured to selectively receive a tray 40 to which a plurality of wheels 24 are affixed.

Figures 9, 10:
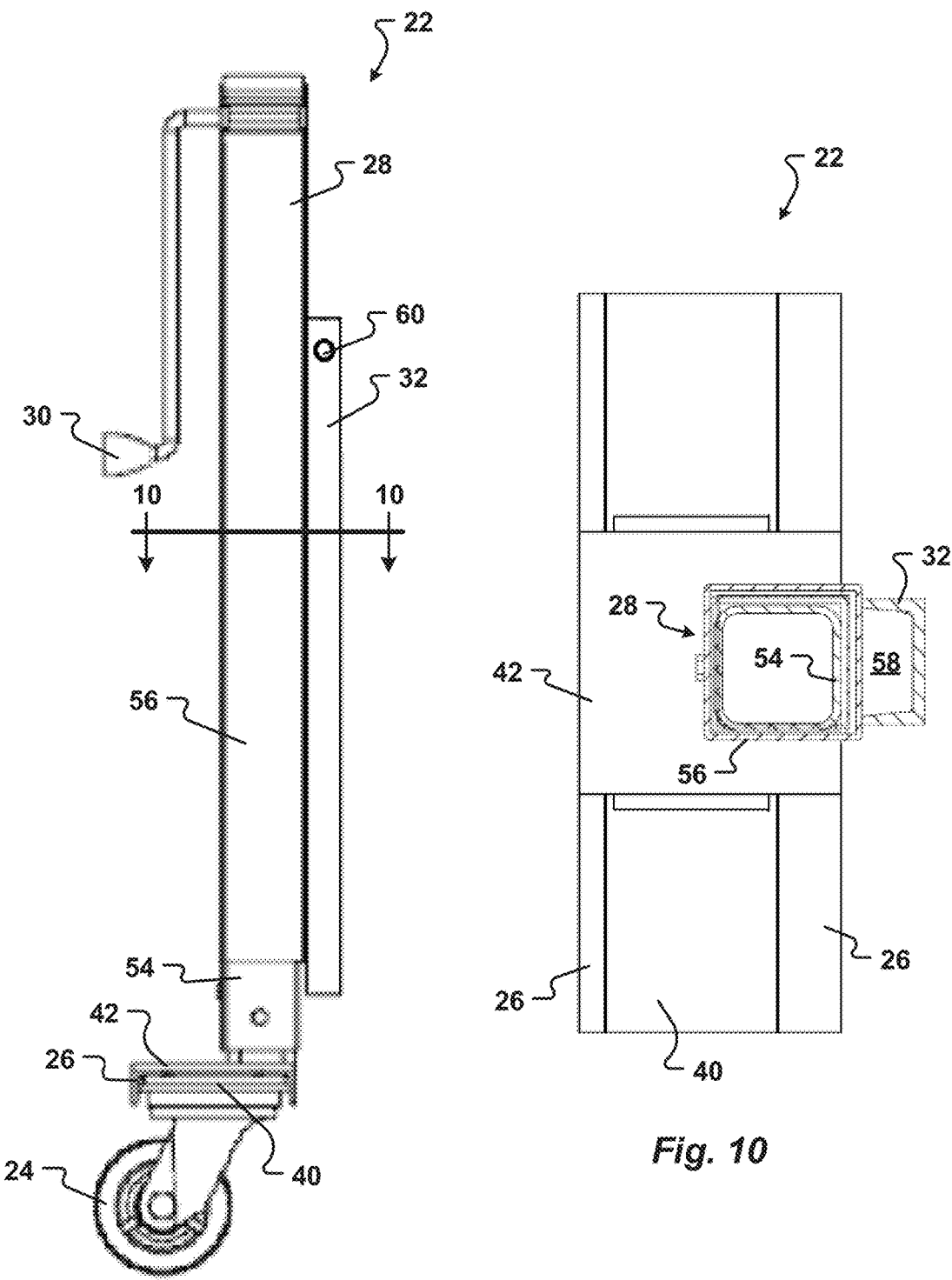
FIG. 9 is a side elevation view of a mobile support apparatus according to one embodiment.
FIG. 10 is a cross-sectional plan view of the of the mobile support apparatus taken along line 10-10 of FIG. 9.

Referring now to FIGS. 9-10, the lifting jack 28 includes an inner portion 54 and an outer portion 56. The inner portion 54 is fixed to the footer 42. In one embodiment, the inner portion is welded to the footer 42. A variety of other means may be used to fix the inner portion 54 to the footer 42 including, but not limited to, U-bolts and various known fasteners.

The outer portion 56 has a generally hollow interior which slidingly engages an exterior surface of the inner portion 54. Optionally, the inner and outer portions 54, 56 are of substantially identical lengths. In one embodiment, the inner and outer portions have lengths of between approximately 10 inches and approximately 20 inches. In another embodiment, the length of the inner and outer portions 54, 56 is approximately 14 inches.

A load bearing extension 32 is interconnected to the outer portion 56 of the lifting jack 28. In one embodiment, the extension 32 comprises a channel with two longitudinal sides fixed to the lifting jack 28. Optionally, fasteners or welds may be used to interconnect the extension to the lifting jack 28. The extension 32 generally includes an open bottom portion 58 and a transverse bore 60 through the longitudinal sides.

The channel of the extension 32 has an interior width at least equal to an exterior width of a hook or projection 43 of the load bearing bracket 34. Optionally, the interior width is not less than approximately 1.50 inches. An exterior width of the extension 32 is less than approximately 2.5 inches and, in one optional embodiment, the exterior width is approximately 2.0 inches. The extension 32 has a height of between approximately 15 inches and approximately 30 inches. In one embodiment, the height of the extension 32 is approximately 20 inches.

As illustrated in FIGS. 11-14, the load bearing bracket 34 generally comprises a body portion 62, a first receiver 66, and a second receiver 68. The body portion 62 includes a projection 43. The projection 43 is configured to be selectively received at least partially within the open bottom portion 58 of the extension 32. In one embodiment, the projection has a height of between approximately 0.75 inches and approximately 1.25 inches. The width of the projection is between approximately 1.0 inch and approximately 2.0 inches.

The bracket body portion 62 also includes an aperture 64 which is positioned to align with the transverse bore 60 of the extension. After the extension 32 receives or otherwise attaches to the projection 43, the mobile support apparatus 22 is rotated such that the lifting jack 28 and the load bearing extension 32 are generally aligned with the load bearing bracket 34. In one embodiment, the load bearing extension 32 is at least partially received within the body portion 62 of the bracket 34. A pin 44 (such as illustrated in FIG. 7B) may then be guided through the aperture 64 and transverse bore 60 to interconnect the extension 32 to the bracket 34. In one embodiment, the pin 44 comprises a hitch pin. Optionally, the bracket body portion 62 may include at least one cylindrical extension 64A associated with the aperture 64 to guide a pin 44.

The load bearing bracket 34 has a height approximately equal to the height of the extension 32. In one embodiment, the height of the bracket 34 is between approximately 15 inches and approximately 30 inches. In some embodiments, the height of the bracket 34 is approximately 20.5 inches. In interior width of the body portion 62 is greater than the exterior width of the extension 32 such that the extension may be received within the body portion 62. In one embodiment, the interior width of the body portion 62 is less than approximately 3.5 inches. In another embodiment, the body portion has an interior width of approximately 3.0 inches.

The receivers 66, 68 include transverse channels 70 with a substantially hollow interior to receive a support member 18. The channels 70 may have a square cross-sectional shape. The channels optionally have a height and a width of less than approximately 1.5 inches. In one embodiment, the height and width of the channels are approximately 1.0 inch. However, other sizes and shapes of the channels 70 are contemplated. In one embodiment, the channels 70 have a round cross-sectional shape with a diameter of less than approximately 1.5 inches. Optionally, each receiver may include a first channel 70A spaced from a second channel 70B. In one embodiment, the first channel 70A is oriented substantially parallel to the second channel 70B.

Referring now to FIGS. 15-17, a support member 18 of another embodiment of the present disclosure is illustrated. The support member 18 is substantially rigid. The support member 18 may have any desired length. The length may be at least equal to a distance between two adjacent stud members 10 to which a mobile support apparatus 22 will be interconnected. In one embodiment, the support member 18 has a length to span stud members 10 with a spacing of approximately 16 inches on center. Optionally, the length of the support member is sufficient to span stud members 10 with a spacing of 24 inches on center. In another embodiment, the modular building unit 20 includes at least two stud members 10 with a stud spacing which is narrower than the standard 16 or 24 inches. Accordingly, the length of the support member 18 may be less than 24 inches. In one embodiment, the length is between approximately 10 inches and approximately 26 inches. In another embodiment, the length is approximately 16 inches.

In one embodiment, the support member has a square or rectangular cross-section similar to the support member 18 illustrated in FIG. 5. Optionally, the support member has a shape that is generally cylindrical. The support member 18 may have a diameter of less than approximately 1.5 inches or, in one embodiment, a diameter of approximately 1.0 inch. In one embodiment, the support member has a hollow interior. Accordingly, the support member may be formed of metal tubing. In one embodiment, the support member 18 is formed of aluminum tubing, although other materials may be used. The tubing of the support member may have a thickness of approximately 0.13 inches.

Referring now to FIGS. 18-21 a hook bracket 72 of one embodiment of the present disclosure is illustrated. The hook bracket 72 generally includes a body portion 74, at least one aperture 76, and an extension 78.

The body portion 74 may be formed of a metal plate material, such as steel. Accordingly, in one embodiment of the present disclosure, the body portion 74 has a shape that is generally planar. The body portion 74 may have various dimensions depending upon the size and weight of a modular building unit 20 to which the hook bracket 72 will be interconnected. Optionally, the body portion 74 has a thickness of up to approximately 0.5 inches. In one embodiment, the thickness of the body portion 74 is between approximately 0.18 inches and approximately 0.3 inches. The body portion 74 has a height of between approximately 3.75 inches and approximately 4.25 inches or, in another embodiment, a height of approximately 4.1 inches. A width of the body portion 74 is between approximately 2.75 inches and approximately 3.5 inches. In one embodiment, the width is approximately 3.19 inches. In one embodiment, the body portion 74 has four generally linear edges joined by four rounded corners.

At least one aperture 76 is formed through the body portion 74. The aperture 76 is adapted to receive a support member 18. When positioned on a support member 18, the hook bracket 72 may slide along the length of the support member. In this manner, the system 1 may be interconnected to a modular building unit 20 with stud members 10 having various spacings, such as greater or less than the standard stud spacing of 16 inches or 24 inches on center. Optionally, one or more bearings may be associated with the aperture 76 to facilitate movement of the hook bracket 72 on the support member 18.

The aperture 76 can have a shape that substantially conforms to a cross-sectional shape of the support member 18. Optionally, the aperture 76 may have a shape that is circular, rectangular, triangular, octagonal, hexagonal, and pentagonal.

In one embodiment, the aperture 76 has a shape that is generally circular. When at least one of the aperture 76 and the support member 18 are circular, the hook bracket 72 may rotate around a longitudinal axis of the support member 18 which may be beneficial to align the extension 78 with a hole in a stud member 10. More specifically, a hole of a stud member 10 may not be formed in the correct position through the stud member. However, by rotating the hook bracket 72 with respect to the support member 18, the extension 78 may be aligned to the hole. Optionally, a diameter of the aperture 76 is between approximately 0.75 inches and approximately 1.25 inches, or approximately 1.0 inches.

The hook bracket 72 may include two apertures 76. Each aperture 76 may receive a support member 18 projecting from transverse channels 70 of a receiver 66, 68. By positioning support members 18 through two apertures 76 of the hook bracket 72, unintended rotation of the hook bracket 54 with respect to the mobile support apparatus 22 is prevented.

The extension 78 projects from the body portion 74. The extension has a size and a shape adapted to fit through a hole in a vertical portion of a stud member 10. The hole of the stud member 10 may be a pre-existing hole. However, the present disclosure further comprises forming a hole through a stud member 10 to receive an extension 78 of a hook bracket 72. Regardless, the hook bracket 72 facilitates quick connection to a stud member 10 of a modular building unit20.

Optionally, a radial cross-section of the extension 78 is generally circular. In another embodiment, the radial cross-section may be square or triangular. The circular extension 78 may have a diameter of between approximately 0.25 inches and approximately 0.75 inches. When the extension 78 is guided through the hole, the hook bracket 72 may be raised by a lifting jack 28 to lift the modular building unit 20. The extension 78 comprises a primary load-bearing member.

The extension 78 may be oriented about perpendicular to the body portion 74. Alternatively, the extension 78 is oriented to be oblique with respect to the body portion 74. More specifically, in one embodiment, the extension 78 is angle upwardly with respect to the body portion and toward a top edge 75. In this manner, when the extension 78 is guided through a hole in a stud member 10, the stud member 10 may slide along the extension 78 toward the body portion 74.

In one embodiment, the extension 78 has a length extending from the body portion 74 by up to approximately 2.0 inches. Optionally, the length is approximately 1.5 inches. In one embodiment, the body portion 74 includes two extensions 78A, 78B.

Optionally, the extension 78 includes at least one notch 80 which engages a vertical portion of a stud 10 of a modular building unit 20. The notch 80 provides a securing feature to prevent inadvertent movement of the stud 10 along the extension 78. More specifically, when the extension 78 is guided through a hole of a stud 10 and then raised, the vertical portion of the stud 10 is received in the notch 80. It will be recognized, however, that other means of preventing unintended movement of the stud member 10 with respect to the extension 78 may be used with the hook bracket 72 of the present disclosure. For example, a bore 86 may optionally be formed through the extension 78. The bore 86 can receive a pin 44 to secure the stud member 10 to the extension.

The notch 80 generally includes two sidewalls 82 and a bottom portion 84. A notch 80A may be positioned proximate to the body portion 74 such that the body portion forms a sidewall 82 of the notch. In this manner, the body portion 74 provides support to a stud 10 engaged by the hook bracket 72 to prevent rotation or other inadvertent movement of the modular building unit 20 when lifted by a mobile support apparatus 22 interconnected to the hook bracket 72.

Figure 19:
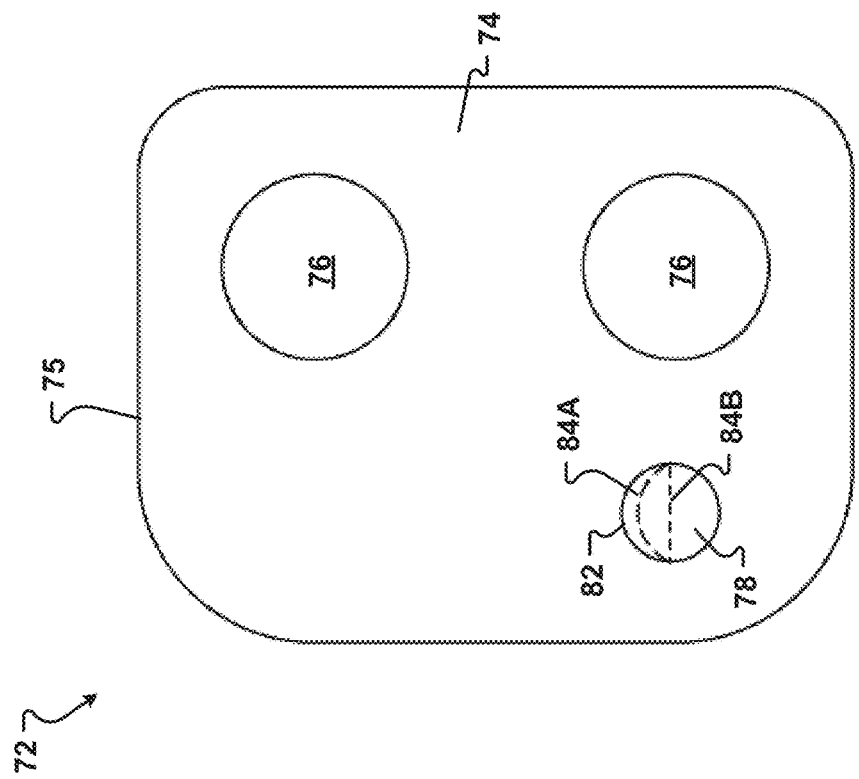
FIG. 19 is a side elevation view of the hook bracket of the embodiment of FIG. 18 and further depicting cross-sectional profiles of a bottom portion of a groove in phantom lines for illustrative purposes.
Figure 18:
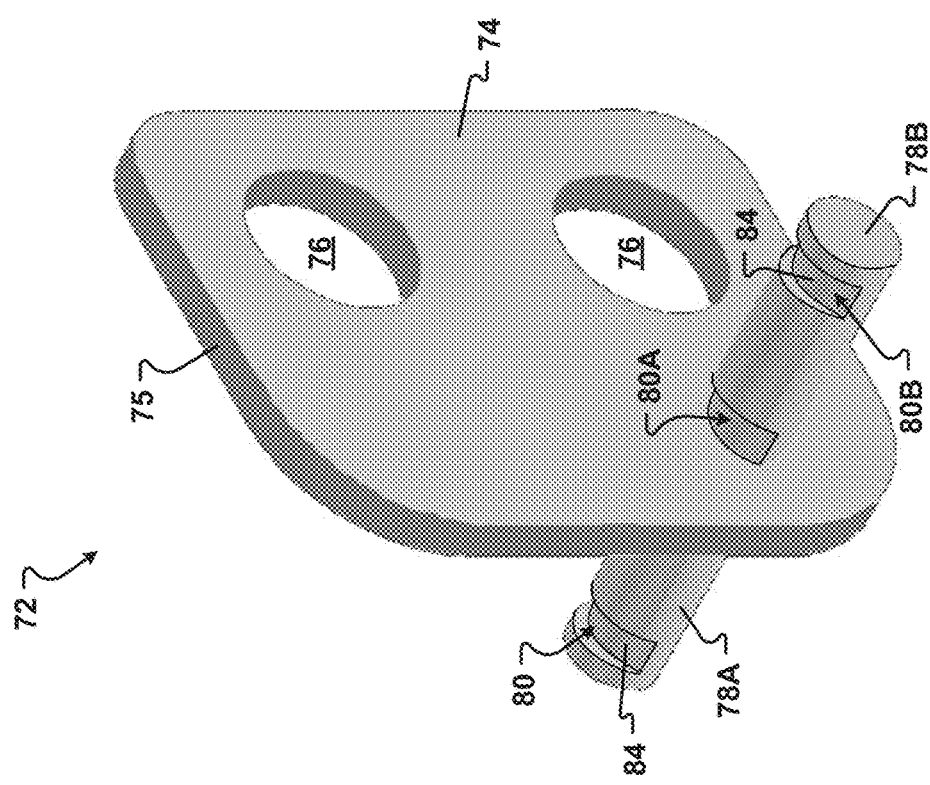
FIG. 18 is a perspective view of a hook bracket according to one embodiment of the present disclosure, the hook bracket to interconnect a mobile support apparatus to a modular building.

In one embodiment, as generally illustrated in FIG. 19, the notch bottom portion 84A has a cross-sectional shape that is arcuate. Optionally, the bottom portion 84A has a radius of curvature about equal to a radius of a hole in the stud member 10. Alternatively, the cross-sectional shape of the bottom portion 84A is generally linear. The notch 80 may be formed by cutting, grinding, or otherwise removing a portion of the extension 78. In another embodiment (not illustrated), the notch 80 extends around the circumference of the extension 78.

The notch has a width at least equal to a thickness of a vertical portion of a stud member 10. Optionally, the notch width is less than approximately 0.4 inches. In one embodiment, the width is approximately 0.25 inches.

The extension may have two notches 80A, 80B. One notch 80B may be formed proximate to a free end of the extension 78. By spacing the notch 80B from the body portion 74, the hook bracket 72 may engage a stud member 10 with an obstruction which prevents a flush connection of the stud member 10 in notch 80A.

Referring now to FIG. 22, in one embodiment, the extension 78 includes a notch 80 with at least one sidewall 82A angled toward a second sidewall 82. More specifically, in one embodiment, the sidewalls 82 are not parallel. The angled sidewall 82A may help guide a vertical portion of a stud member 10 into the notch 80. Optionally, both sidewalls may be oblique with respect to the body portion 74.

As illustrated in FIG. 23, in one embodiment of the present disclosure, the extension 78 includes at least one protrusion 88 extending generally radially from the extension. The protrusion is spaced from the body portion 74. Accordingly, when the extension 78 is guided through a hole in a stud member 10, the hook bracket 72 may be raised such that a vertical portion of the stud member 10 is retained between the protrusion 88 and the body portion 74. The protrusion 88 may include two sidewalls. Optionally, the sidewalls are generally parallel. Alternatively, and referring now to FIG. 24, in another embodiment at least one sidewall of the protrusion 88 is not parallel to a second sidewall.

What is claimed is:

1. A system for selective interconnection to a stud member of a building unit, comprising:
    a hook bracket with a body portion, an aperture extending through the body portion, and an extension projecting from the body portion, the extension operable to fit through a hole of the stud member and apply a vertically oriented force thereto, wherein the extension includes a notch to receive a portion of the stud member;
    a support member selectively extending through the aperture of the body portion, the support member oriented substantially horizontally; and
    a transport device adapted to operatively engage the support member.

2. The system of claim 1, wherein the transport device comprises a dolly.

3. The system of claim 1, wherein the transport device further comprises:
    a lifting jack; and
    an extension interconnected to the lifting jack, the extension configured to connect to a bracket to which the support member is engaged.

4. The system of claim 1, wherein the body portion of the hook bracket is generally planar.

5. The system of claim 1, wherein the notch includes a first sidewall, a bottom portion, and a second sidewall.

6. The system of claim 5, wherein the bottom portion has a shape that is generally arcuate.

7. The system of claim 5, wherein the first and second sidewalls are generally parallel.

8. The system of claim 5, wherein the first sidewall is defined by a portion of the body portion.

9. The system of claim 1, wherein the extension projects from each of a first side and a second side of the body portion.

10. The system of claim 1, wherein the extension has a shape that is generally cylindrical.

11. The system of claim 1, wherein the hook bracket may be selectively positioned along a length of the support member to accommodate spacing between the stud member and a second stud member of the building unit.

12. A hook bracket adapted to operatively interconnect a transport device to a stud member of a building unit, comprising:
    a body portion;
    a first aperture extending at least partially through the body portion;
    a second aperture extending at least partially through the body portion, the first and second apertures configured to receive first and second support members operatively engaged by the transport device; and
    an extension projecting from the body portion, the extension operable to contact the stud member such that the transport device may transmit a force to the building unit.

13. The hook bracket of claim 12, wherein the first and second apertures have shapes that are generally circular.

14. The hook bracket of claim 12, wherein the extension is configured to extend through an aperture through the stud member.

15. The hook bracket of claim 12, further comprising a notch formed in the extension, the notch including a first sidewall, a bottom portion, and a second sidewall.

16. The hook bracket of claim 15, wherein the bottom portion is non-planar.

17. A method of interconnecting a transport device to a stud member of a building unit, comprising:
    interconnecting a support member to a load bearing bracket;
    guiding the support member through an aperture of a hook bracket;
    positioning an extension of the hook bracket in an aperture extending at least partially through the stud member, the extension being generally cylindrical, wherein the extension includes a notch to engage a portion of the stud member; and
    interconnecting the transport device to the load bearing bracket.

18. The method of claim 17, wherein interconnecting the transport device to the load bearing bracket further comprises:
    positioning a projection of the load bearing bracket in a receiver of the transport device; and
    guiding a pin through the receiver and the load bearing bracket.

19. The method of claim 17, wherein the extension projects from a body portion of the hook bracket, and wherein the body portion of the hook bracket is generally planar.

20. The method of claim 17, wherein the notch includes a first sidewall, a bottom portion, and a second sidewall.

* * * * *